US012757134B2

(12) United States Patent
Yoon

(10) Patent No.: US 12,757,134 B2
(45) **Date of Patent: *Oct. 6, 2026**

(54) METHOD AND APPARATUS FOR SYNCHRONIZATION FOR VEHICLE-TO-X COMMUNICATION

(71) Applicant: Innovative Technology Lab Co., Ltd., Seoul (KR)

(72) Inventor: Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,775

(22) Filed: May 9, 2022

(65) Prior Publication Data

US 2022/0279464 A1 Sep. 1, 2022

Related U.S. Application Data

(63) Continuation of application No. 15/475,933, filed on Mar. 31, 2017, now Pat. No. 11,363,546.

(30) Foreign Application Priority Data

Apr. 1, 2016 (KR) ........................ 10-2016-0040411

(51) Int. Cl.
*H04W 56/00* (2009.01)
*G01S 19/13* (2010.01)
(Continued)

(52) U.S. Cl.
CPC ........... *H04W 56/001* (2013.01); *G01S 19/13* (2013.01); *H04B 1/3822* (2013.01);
(Continued)

(58) Field of Classification Search
CPC . H04W 56/001; H04W 4/40; H04W 56/0015; H04W 56/0025; G01S 19/13;
(Continued)

(56) References Cited

U.S. PATENT DOCUMENTS 10,034,253 B2 7/2018 Hashemi et al.
10,511,422 B2 * 12/2019 Kim ..................... H04L 5/0051
(Continued)

FOREIGN PATENT DOCUMENTS

WO 2009008625 A2 1/2009
WO 2014/182493 A1 11/2014
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211 V13.1.0, Mar. 2016, pp. 1-155, 3GPP.
(Continued)

*Primary Examiner* — Derrick W Ferris
*Assistant Examiner* — M Mostazir Rahman

(57) ABSTRACT

Provided is a synchronization method and apparatus in a wireless communication system. A synchronization method according to an aspect of the present disclosure may include: receiving a first synchronization signal and a second synchronization signal; determining a priority order of the first synchronization signal and the second synchronization signal; and performing synchronization based on a synchronization signal having a higher priority between the first synchronization signal and the second synchronization signal.

20 Claims, 9 Drawing Sheets

(51) Int. Cl.

| | |
|---|---|
| ***H04B 1/3822*** | (2015.01) |
| ***H04L 5/00*** | (2006.01) |
| ***H04L 27/26*** | (2006.01) |
| ***H04L 67/12*** | (2022.01) |

(52) U.S. Cl.
CPC .......... *H04L 5/0051* (2013.01); *H04L 5/0053* (2013.01); *H04L 27/2613* (2013.01); *H04L 27/2692* (2013.01); *H04L 67/12* (2013.01); *H04L 27/2636* (2013.01)

(58) Field of Classification Search
CPC ....... G01S 19/01; G01S 19/31; H04B 1/3822; H04L 5/0051; H04L 5/0053; H04L 27/2613; H04L 27/2692; H04L 67/12; H04L 27/2636; H04L 5/0007; H04L 5/003; H04L 7/0087; H04L 7/0091; H04L 7/0095; H04L 1/0071; H04L 5/001; H04L 5/0048; H04L 5/0064; H04L 27/2655
See application file for complete search history.

(56) References Cited

U.S. PATENT DOCUMENTS

| | | | | |
|---|---|---|---|---|
| 2011/0317780 | A1 | 12/2011 | Kang et al. | |
| 2013/0229953 | A1 | 9/2013 | Zhang et al. | |
| 2013/0250818 | A1 | 9/2013 | Gaal et al. | |
| 2013/0272262 | A1 | 10/2013 | Li et al. | |
| 2014/0334399 | A1 | 11/2014 | Xu et al. | |
| 2015/0018010 | A1 | 1/2015 | Fischer | |
| 2015/0351059 | A1 | 12/2015 | Seo | |
| 2016/0044618 | A1 | 2/2016 | Sheng et al. | |
| 2017/0188391 | A1 | 6/2017 | Rajagopal et al. | |
| 2018/0199298 | A1* | 7/2018 | Wakabayashi ...... | H04W 72/566 |
| 2018/0213498 | A1* | 7/2018 | Khoryaev ............ | H04B 7/2684 |
| 2018/0220388 | A1 | 8/2018 | Chae et al. | |
| 2018/0234928 | A1 | 8/2018 | Yasukawa et al. | |
| 2018/0242374 | A1* | 8/2018 | Harada ................. | H04W 72/04 |
| 2018/0270776 | A1* | 9/2018 | Yasukawa ......... | H04W 56/0015 |
| 2019/0045474 | A1* | 2/2019 | Li ......................... | H04W 24/10 |
| 2019/0069255 | A1 | 2/2019 | Zhao et al. | |
| 2020/0296678 | A1* | 9/2020 | Zhang ................. | H04W 56/002 |

FOREIGN PATENT DOCUMENTS

| | | | |
|---|---|---|---|
| WO | 2015026140 | A1 | 2/2015 |
| WO | 2015199392 | A1 | 12/2015 |
| WO | 2016122761 | A1 | 8/2016 |
| WO | 2017116108 | A1 | 7/2017 |

OTHER PUBLICATIONS

International Search Report (PCT/KR2017/003573).
Written Opinion of the International Searching Authority (PCT/KR2017/003573).
Notification of Transmittal of the International Search Report and the Written Opinion of the International Searching Authority, or the Declaration (PCT/KR2017/003573).
Extended European search report for European Patent Application No. 17 775 911.5. Nov. 6, 2019.
International Search Report for PCT/KR2016/015298. Apr. 11, 2017.
Huawei et al., Collision avoidance for Mode 2, R1-156932, 3GPP TSG RAN WG1 Meeting #83, Anaheim, USA, Nov. 7, 2015.
CATT, "Further discussion on resource allocation mechanism in PC5-based V2V", R1-157449, 3GPP TSG RAN WG1 Meeting #83, Anaheim, USA, Nov. 13, 2015.
Intel Corporation, "Discussion on network control aspects for V2V communication", R1-156689, 3GPP TSG RAN WG1 Meeting #83, Anaheim, USA, Nov. 7, 2015.
International Search REPORT(PCT/KR2017/008764).
Written Opinion of the International Searching Authority(PCT/KR2017/008764).
Notification of Transmittal of the International Search Report and the Written Opinion of the International Searching Authority, or the Declaration(PCT/KR2017/008764).
3GPP TSG RAN WG1 Meeting #85 R1-164661 Nanjing, China, May 23-27, 2016 "Adaptive RSTD reporting for Indoor positioning".
3GPP TSG-RAN WG1 Meeting #85 R1-164449 Nanjing, China, May 23-27, 2016. "Introduction of UE inter-frequency RSTD calibration accuracy reporting". Qualcomm Incorporated.
Extended European Search report for Application No. 22162636.9-1203. Dated Jun. 23, 2022.
Huawei et al., "SLSS and PSBCH design for V2V", 3GPP TSG RAN WG1 Meeting #84, R1-106758, St Julian's, Malta, Feb. 15-19, 2016.
Huawei et al., "Final details of D2D synchronization signals", 3GPP TSG RAN WG1 Meeting #79, R1-144566, San Francisco, USA, Nov. 17-21, 2014.
Intel Corporation, "Design of Secondary D2D Synchronization Signal", 3GPP TSG RAN WG1 Meeting #79, R1-144649, San Francisco, USA, Nov. 17-21, 2014.
ZTE, "Synchronization for V2V", 3GPP TSG-RAN WG1 Meeting #83, R1-156661, Anaheim, USA, Nov. 15-22, 2015.
LTE; E-UTRA; Physical channels and modulation (3GPP TS 36.211 V12.6.0 Release 12) (Jul. 2015).
LTE; E-UTRA; Radio Resource Control (RRC); Protocol specification (3GPP TS 36.331 version 12.8.0 Release 12) (Jan. 2016).
Office Action/Rejection issued by Indian Patent Office, in counterpart Patent Application 202418008699, on Jun. 5, 2026.

* cited by examiner

V2V OPERATION

V2I OPERATION

V2P OPERATION

METHOD AND APPARATUS FOR SYNCHRONIZATION FOR VEHICLE-TO-X COMMUNICATION

CROSS-REFERENCE TO RELATED APPLICATION

This application is a continuation of U.S. application Ser. No. 15/475,933, filed on Mar. 31, 2017, which claims priority from and the benefit of Korean Patent Application No. 10-2016-0040411 filed on Apr. 1, 2016 which is hereby incorporated by reference in its entirety.

BACKGROUND

1. Field

The present disclosure relates to wireless communication, and more particularly, to a synchronization method and apparatus in Vehicle to X (V2X) communication.

2. Discussion of the Background

Vehicle-to-X (V2X: vehicle-to-everything) communication refers to a communication scheme that exchanges or shares information, such as traffic conditions or the like through communication with roadway infrastructures and other vehicles during driving. V2X may include vehicle-to-vehicle (V2V) indicating LTE-based communication between vehicles, vehicle-to-pedestrian (V2P) indicating LTE-based communication between terminals carried by a vehicle and a person, and vehicle-to-infrastructure/network (V2I/N) indicating LTE-based communication between a vehicle and a roadside unit/network. In this instance, the roadside unit (RSU) may be a base station or a transportation infrastructure entity embodied by a fixed terminal. For example, it may be an entity that transmits a speed notification to a vehicle.

V2X technology is associated with a V2X environment that performs synchronization according to a Global Navigation Satellite System (GNSS) or a device equivalent to GNSS (hereinafter GNSS-equivalent device), in addition to performing synchronization according to a time reference from an evolved Node B (eNB) or a User Equipment (UE).

SUMMARY

An aspect of the present disclosure is to provide a method in which a Vehicle-to-X (V2X) User Equipment (UE) effectively selects synchronization by taking into consideration the priority of received synchronization signals in V2X communication, and an apparatus for that method.

Another aspect of the present disclosure is to provide a method in which a V2X UE effectively transmits a selected synchronization signal to another V2X UE, and an apparatus for that method.

According to an aspect of the present disclosure, a method of generating a synchronization signal, the method including: synchronizing, by a first device, a timing of a synchronization signal received from a synchronization source, the timing of the synchronization signal being associated with a synchronization timing of a Global Navigational Satellite System (GNSS); determining a subframe to transmit a primary sidelink synchronization signal (PSSS) and a secondary sidelink synchronization signal (SSSS); mapping the SSSS to two consecutive single frequency-frequency division multiple access (SC-FDMA) symbols in the determined subframe; and transmitting, from the first device to a second device, the PSSS and the SSSS in the determined subframe. The mapping the SSSS includes: generating a first length-31 sequence based on mi; generating a second length-31 sequence based on $m_0$, where $m_1$ is greater than $m_0$; and mapping the first length-31 sequence and the second length-31 sequence to 62 consecutive subcarriers in the two consecutive SC-FDMA symbols in the determined subframe, wherein a portion of the first length-31 sequence is mapped to a subcarrier having a lowest index among the 62 consecutive subcarriers and a portion of the second length-31 sequence is mapped to a subcarrier having a highest index among the 62 consecutive subcarriers.

According to an aspect of the present disclosure, a method of selecting a synchronization signal, the method including: determining, by a first device, at least one of synchronization signals transmitted from a plurality of synchronization sources, wherein the plurality of synchronization sources include an evolved NodeB (eNB), a Global Navigational Satellite System (GNSS), and a device capable of synchronizing with a GNSS; and synchronizing, by the first device, a timing of a synchronization signal selected from the determined synchronization signals, the timing of the selected synchronization signal being associated with a synchronization timing of the GNSS. The synchronizing the timing of the synchronization signal includes: determining a subframe to which a primary sidelink synchronization signal (PSSS) of the synchronization signal is mapped; and determining a secondary sidelink synchronization signal (SSSS) of the synchronization signal from 62 consecutive subcarriers of two consecutive single frequency-frequency division multiple access (SC-FDMA) symbols in the determined subframe. The SSSS includes a first length-31 sequence generated based on $m_1$ and a second length-31 sequence generated based on $m_0$, where $m_1$ is greater than $m_0$, and a portion of the first length-31 sequence is mapped to a subcarrier having a lowest index among the 62 consecutive subcarriers and a portion of the second length-31 sequence is mapped to a subcarrier having a highest index among the 62 consecutive subcarriers.

According to an aspect of the present disclosure, a method of performing synchronization in a wireless communication system is provided. The method may include receiving a first synchronization signal and a second synchronization signal, determining a priority order of the first synchronization signal and the second synchronization signal, and performing synchronization based on a synchronization signal having a higher priority out of the first synchronization signal and the second synchronization signal. In this instance, the preferred signal between the first synchronization signal and the second synchronization signal is determined based on the root index for the primary synchronization signal of each of the first synchronization signal and the second synchronization signal. When the root indices of the first synchronization signal and the second synchronization signal are the same, the preferred signal is determined based on an index sequence of a secondary synchronization signal of each of the first synchronization signal and the second synchronization signal.

A device may determine a priority of synchronization signals based on synchronization sources, such as an eNB, a UE, a GNSS, a GNSS-equivalent device, or the like under the V2X situation. A device may distinguish each synchronization source through a Sidelink Synchronization Signal (SLSS), a Physical Sidelink Broadcast Channel (PSBCH), and the like.

According to the present disclosure, a V2X UE may effectively select synchronization by taking into consideration the priority of received synchronization signals.

Also, the V2X UE may effectively transmit a selected synchronization signal to another V2X UE.

DETAILED DESCRIPTION OF THE ILLUSTRATED EMBODIMENTS

In this disclosure, various embodiments for Vehicle-to-X (V2X) will be described in detail.

According to an embodiment of the present disclosure, V2X refers to V2V, V2P, and V2I/N, which may be defined, in association with LTE communication, as provided below. Table 1 shows details.

TABLE 1

| | |
|---|---|
| V2V | covering LTE-based communication between vehicles |
| V2P | covering LTE-based communication between a vehicle and a device carried by an individual (e.g. handheld terminal carried by a pedestrian, cyclist, driver or passenger) |
| V2I/N | covering LTE-based communication between a vehicle and a roadside unit/network<br>A roadside unit (RSU) is a stationary infrastructure entity supporting V2X applications that can exchange messages with other entities supporting V2X applications.<br>Note: RSU is a term frequently used in existing ITS specifications, and the reason for introducing the term in the 3GPP specifications is to make the documents easier to read for the ITS industry. RSU is a logical entity that combines V2X application logic with the functionality of an eNB (referred to as eNB-type RSU) or UE (referred to as UE-type RSU). |

For a V2X operation based on PC5 which is a D2D communication link (i.e., a direct interface between two devices that support ProSe) out of V2X, various scenarios such as Table 2, Table 3, and Table 4 are considered with reference to FIGS. 1A, 1B, 1C, 2A, 2B, 2C, 3A, and 3B.

FIGS. 1A, 1B, 1C, 2A, 2B, 2C, 3A, and 3B are diagrams illustrating a V2X scenario associated with the present disclosure.

Figure 1A:
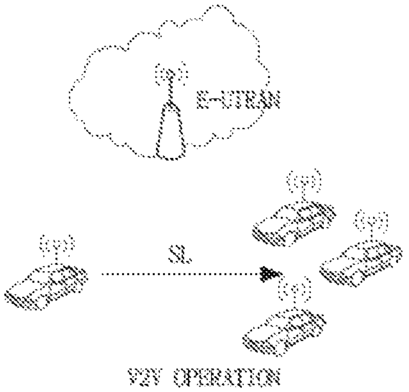
FIGS. 1A, 1B, 1C, 2A, 2B, 2C, 3A, and 3B are block diagrams illustrating scenarios available in a V2X wireless communication system according to the present disclosure.
Figure 1B:
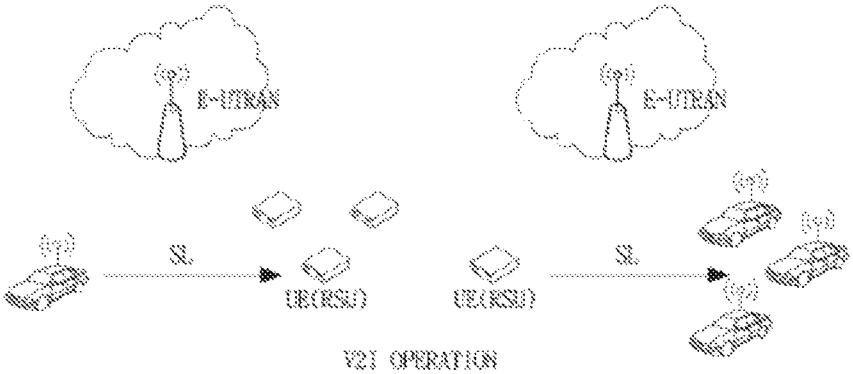
Figure 1C:
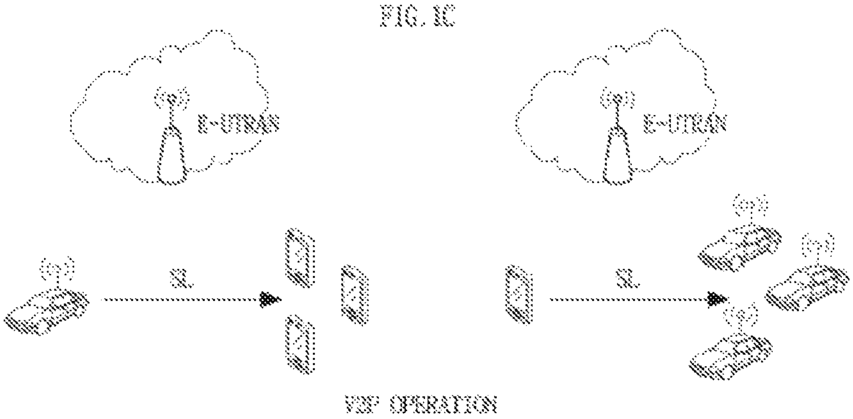

Table 2 and FIG. 1A through FIG. 1C illustrate a scenario that supports V2X operation based on only a PC5 interface. FIG. 1A illustrates a V2V operation. FIG. 1B illustrates a V2I operation. FIG. 1C illustrates a V2P operation.

TABLE 2

| |
|---|
| This scenario supports V2X operation only based on PC5.<br>In this scenario, a UE transmits a V2X message to multiple UEs at a local area in sidelink.<br>For V2I, either transmitter UE or receiver UE(s) are UE-type RSU,<br>For V2P, either transmitter UE or receiver UE(s) are pedestrian UE. |

Figure 2A:
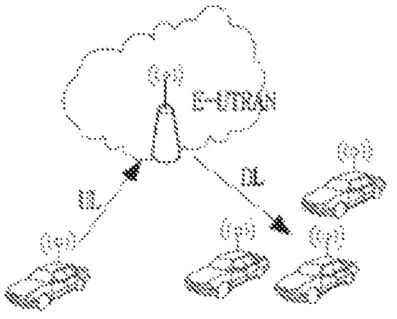
Figure 2B:
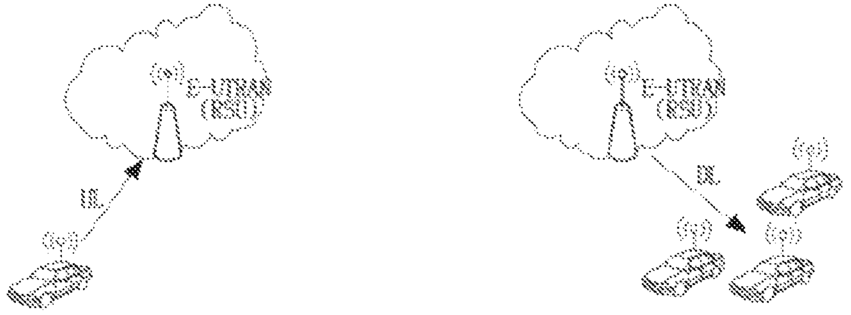
Figure 2C:
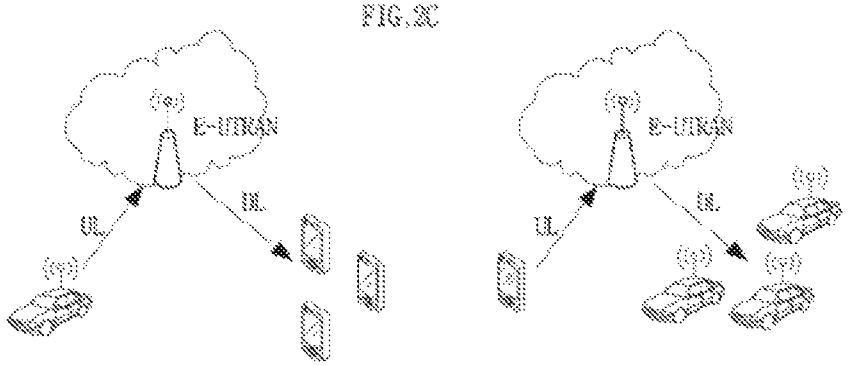

Table 3 and FIGS. 2A through 2C illustrate a scenario that supports V2X operation based on only a Uu interface (i.e., an interface between a UE and an eNB). FIG. 2A illustrates a V2V operation. FIG. 2B illustrates a V2I operation. FIG. 2C illustrates a V2P operation.

TABLE 3

| |
|---|
| This scenario supports V2X operation only based on Uu.<br>In this scenario,<br>For V2V and V2P, a UE transmits a V2X message to E-UTRAN in uplink and E-UTRAN transmits it to multiple UEs at a local area in downlink.<br>For V2I, when receiver is eNB type RSU, a UE transmits a V2I message to E-UTRAN(eNB type RSU) in uplink; when transmitter is eNB type RSU, E-UTRAN(eNB type RSU) transmits a I2V message to multiple UEs at a local area in downlink.<br>For V2P, either transmitter UE or receiver UE(s) are pedestrian UE.<br>To support this scenario, E-UTRAN performs uplink reception and downlink transmission of V2X messages. For downlink, E-UTRAN may use a broadcast mechanism. |

Figure 3A:
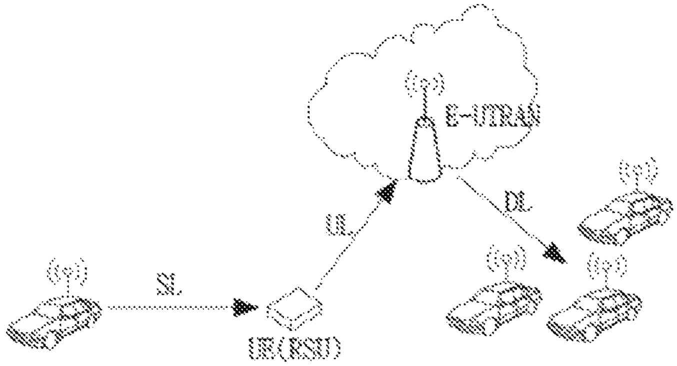
Figure 3B:
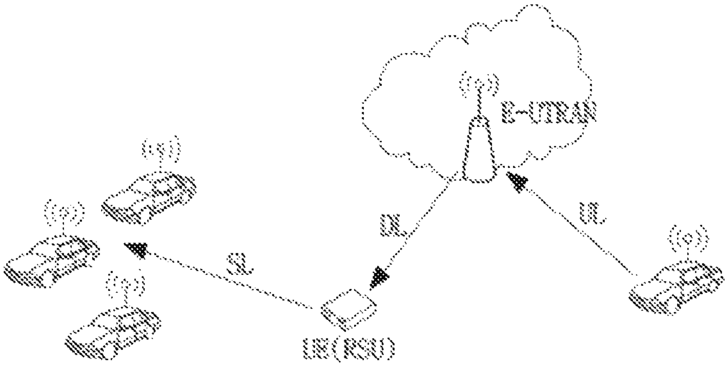

Table 4 and FIGS. 3A to 3B illustrate a scenario that supports V2X operation based on both a Uu interface and a PC5 interface. FIG. 3A illustrates scenario 3A of Table 4 and FIG. 3B illustrates scenario 3B of Table 4.

TABLE 4

| This scenario supports V2V operation using both Uu and PC5. | |
|---|---|
| Scenario 3A | In this scenario, a UE transmits a V2X message to other UEs in sidelink. One of the receiving UEs is a UE type RSU which receives the V2X message in sidelink and transmits it to E-UTRAN in uplink. E-UTRAN receives the V2X message from the UE type RSU and then transmits it to multiple UEs at a local area in downlink.<br>To support this scenario, E-UTRAN performs uplink reception and downlink transmission of V2X messages. For downlink, E-UTRAN may use a broadcast mechanism. |
| Scenario 3B | In this scenario, a UE transmits a V2X message to E-UTRAN in uplink and E-UTRAN transmits it to one or more UE type RSUs. Then, the UE type RSU transmits the V2X message to other UEs in sidelink.<br>To support this scenario, E-UTRAN performs uplink reception and downlink transmission of V2X messages. For downlink, E-UTRAN may use a broadcast mechanism. |

Terminologies and abbreviations used in the present disclosure are defined as provided below.

D2D: Device to Device (communication)
ProSe: (Device to Device) Proximity Services
V2X: Vehicle to X
V2V: Vehicle to Vehicle
V2P: Vehicle to Pedestrian
V2I/N: Vehicle to Infrastructure/Network
GNSS: Global Navigation Satellite System
RSU: Road Side Unit
SL: Sidelink
SCI: Sidelink Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
PSS: Primary Synchronization Signal
SSS: Secondary Synchronization Signal
SLSS: Sidelink Synchronization Signal
PSSS: Primary Sidelink Synchronization Signal
SSSS: Secondary Sidelink Synchronization Signal
PSSID: Physical-layer Sidelink Synchronization Identity
$N^{SL}_{ID}$: Physical-layer Sidelink Synchronization Identity
$n^{SA}_{ID}$: Sidelink Group Destination Identity FIG. 4A through FIG. 4C are conceptual diagrams illustrating a synchronization method for PC5 link-based V2X communication that complies with D2D (ProSe) according to an embodiment of the present disclosure.

Figure 4A:
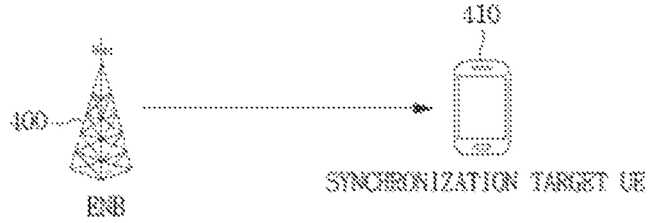
FIG. 4A through FIG. 4C are conceptual diagrams illustrating a synchronization method for V2X communication according to an embodiment of the present disclosure.
Figure 4B:
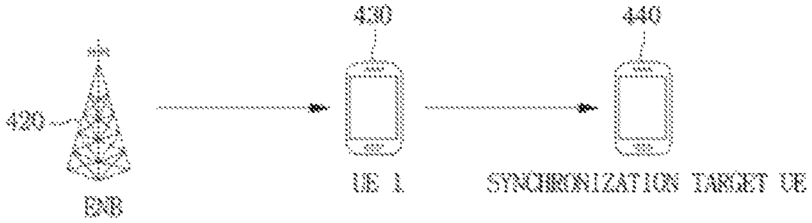
Figure 4C:
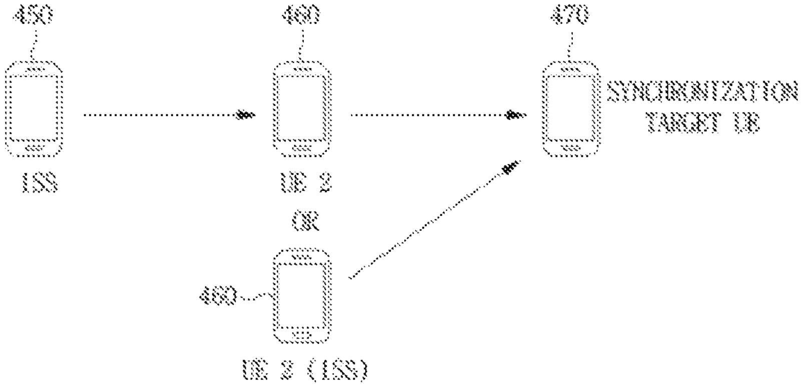

Referring to FIGS. 4A, 4B, and 4C, a UE, e.g., a V2X UE, that performs V2X communication may perform frequency synchronization and/or time synchronization for V2X communication based on a synchronization signal generated by a base station or by another UE.

Hereinafter, "synchronization target UE" is a term that indicates a UE that receives a synchronization signal for V2X communication. Also, a UE or an eNB that transmits a synchronization signal to a synchronization target UE is expressed using the term "synchronization source."

Among synchronization sources, a synchronization source may be expressed using the term "original synchronization source" or "active synchronization source" if it is not synchronized by another synchronization source and if it transmits a synchronization signal generated based on its own reference synchronization to a synchronization target UE. A synchronization source excluding an active synchronization source from synchronization sources may be expressed using the term "passive synchronization source." That is, at least one passive synchronization source may be synchronized by a single active synchronization source, and may transmit a synchronization signal to a synchronization target UE.

For example, an eNB is not synchronized by another UE or eNB and transmits a synchronization signal generated based on its own reference synchronization; thus, the eNB may be termed an active synchronization source. Also, among UEs, a UE that is not synchronized by another UE or eNB and operates as an active synchronization source may be expressed using the term "Independent Synchronization Source (ISS)."

Referring to FIGS. 4A, 4B, and 4C, a synchronization method in V2X communication may roughly include three cases, that is, FIGS. 4A, 4B, and 4C, which are distinguished based on the following differences.

FIG. 4A illustrates the case in which a synchronization target UE is synchronized by receiving a Primary Synchronization Signal (PSS)/Secondary Synchronization Signal (SSS) from an eNB. Unlike the case in FIG. 4A, FIGS. 4B and 4C illustrate the case in which a synchronization target UE is synchronized by receiving, from a UE, a Primary Sidelink Synchronization Signal (PSSS)/Secondary Sidelink Synchronization Signal (SSSS) which will be described below. FIGS. 4B and 4C are distinguished based on whether the active synchronization source is an eNB or an ISS.

The synchronization operations executed in FIGS. 4A, 4B, and 4C will be described in detail as follows.

FIG. 4A discloses a method in which a synchronization target UE is synchronized based on a synchronization signal transmitted from an eNB in D2D communication.

Referring to FIG. 4A, the synchronization source for D2D communication of a synchronization target UE 410 is an eNB 400, and the eNB 400 is an active synchronization source. The synchronization signal transmitted from the eNB 400 to the synchronization target UE 410 may be a Primary Synchronization Signal (PSS)/Secondary Synchronization Signal (SSS). The synchronization target UE 410 may receive a PSS/SSS from the eNB, may execute frequency synchronization and/or time synchronization based on the received PSS/SSS, and may execute V2X communication with another UE.

FIG. 4B illustrates the case in which a synchronization target UE 440 is synchronized by a UE 1 430. In this instance, the UE 1 430 is a passive synchronization source synchronized by an eNB 420 which is an active synchronization source. Between the UE 1 430 and the eNB 420, a plurality of different passive synchronization sources may exist. For ease of description, it is assumed that the UE 1 430 is synchronized directly by the eNB 420.

In FIG. 4B, the UE 1 430 may be a passive synchronization source, which is synchronized based on a synchronization signal (PSS/SSS) transmitted from the eNB 420. The UE 1 430 synchronized by the eNB 420 may transmit a Sidelink Synchronization Signal (SLSS) to a synchronization target UE. The synchronization target UE may be synchronized with the UE 1 430 based on the SLSS received from the UE 1 430. An SLSS may include a Primary SLSS (PSSS) and a Secondary SLSS (SSSS).

FIG. 4C illustrates the case in which a synchronization target UE 470 is synchronized by a UE 2 460. In this instance, the UE 2 460 is a passive synchronization source that is synchronized by an ISS 450 which is an active synchronization source, or the UE 2 460 is an active synchronization source. When the UE 2 460 is a passive synchronization source, a plurality of different passive synchronization sources may exist between the UE 2 460 and the ISS 450.

That is, the synchronization target UE 470 may be synchronized based on an SLSS transmitted to the synchronization target UE 470. This SLSS may be transmitted from the UE 2 460 that operates as an active synchronization source or from the UE 2 460 that is synchronized based on the ISS 450 and operates as a passive synchronization source.

In FIG. 4A, the synchronization target UE 410 may obtain information associated with a Physical Cell Identity (PCID) of an eNB, based on a PSS/SSS, as in the LTE system.

According to an embodiment of the present disclosure, when synchronization target UEs 440 and 470 receive an SLSS, similar to the cases in FIGS. 4B and 4C, the synchronization target UE 440 and 470 may obtain identity information of an active synchronization source based on the SLSS.

Here, the identity information of a synchronization source may be expressed using the term "Physical-layer Sidelink Synchronization Identity (PSSID)." In the case of a passive synchronization source that is synchronized by a single active synchronization source and that transmits a synchronization signal to a synchronization target UE, the identity information of the passive synchronization source uses the identity information of the active synchronization source, and thus, the identity information of the synchronization source (PSSID) may actually be the identity information of the active synchronization source. In V2X communication, a sidelink is used to express a communication link between UEs, instead of using an uplink or a downlink.

As described above, in FIGS. 4B and 4C, the synchronization target UE 440 and 470 may obtain the identity information of the active synchronization source based on an SLSS. Particularly, in FIG. 4B, the identity information of an active synchronization source corresponding to the eNB 420 may be obtained by the synchronization target UE 440 based on an SLSS. In FIG. 4C, the identification information of an active synchronization source corresponding to the ISS 450 may be obtained based on an SLSS. The synchronization target UE 440 and 470 may obtain identity information of an eNB or identity information of an ISS that operates as an active synchronization source, based on the identity information (PSSID) of the active synchronization source.

Also, according to an embodiment of the present disclosure, when the active synchronization source is the eNB 420, as illustrated in FIG. 4B, an SLSS may be generated based on one of the sequences included in a D2DSSue_net set. When the active synchronization source is the ISS 450, as illustrated in FIG. 4C, an SLSS may be generated based on one of the sequences included in a D2DSSue_oon set. That is, according to an embodiment of the present disclosure, when the synchronization target UE 440 and 470 does not directly receive a synchronization signal from an eNB, the synchronization target UE 440 and 470 may receive a synchronization signal generated based on a different sequence set according to whether the active synchronization source is the eNB 420 or the ISS 450. Hereinafter, D2DSSue_net may be expressed using the term "eNB source sequence set", and D2DSSue_oon may be expressed using the term "UE source sequence set".

The synchronization target UE 440 and 470 may determine whether the active synchronization source is the eNB 420 or the ISS 450, based on information associated with a sequence that generates a received SLSS.

As described with reference to FIGS. 4A, 4B, and 4C, a synchronization method for V2X communication based on a PC5 link of D2D (ProSe) has been described by distinguishing the case in which an original synchronization source (or an active synchronization source) is an eNB (FIG. 4A and FIG. 4B) and the case in which an original synchronization source is a UE (FIG. 4C). However, V2X may perform synchronization according to a Global Navigation Satellite System (GNSs) or a GNSS-equivalent device. That is, a GNSS or a GNSS-equivalent device needs to be considered a synchronization source, in addition to an eNB or a UE. In this instance, in FIGS. 4A through 4C, a GNSS or a GNSS-equivalent device may be used as an original synchronization source (or an active synchronization source), instead of an eNB or a UE. A synchronization process from the GNSS (or the GNSS-equivalent device corresponding to the original synchronization source, i.e. the active synchronization source) to a UE corresponding to a passive synchronization source may be equivalently applied as described above.

Next, a synchronization signal will be described in detail.

The number of physical-layer cell identities is 504. The physical layer cell identities are grouped into 168 physical-layer cell-identity groups. In this instance, each group includes three unique identities.

A physical layer cell identity $N^{cell}_{ID}$ is defined as $3N^{(1)}_{ID}+N^{(2)}_{ID}$. The physical layer cell identity $N^{cell}_{ID}$ may be determined by $N^{(1)}_{ID}$ and $N^{(2)}_{ID}$. Here, $N^{(1)}_{ID}$ indicates a physical-layer cell-identity group and has a value in the range of 0 to 167. $N^{(2)}_{ID}$ indicates a physical layer identity in a physical-layer cell-identity group and has a value in the range of 0 to 2. A PSS may be generated based on the Zadoff-Chu sequence provided below.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In Equation 1, u is a root index value, and may be determined as one of the values listed in Table 5.

TABLE 5

| N(2)ID | Root Index u |
|---|---|
| 0 | 25 |
| 1 | 29 |
| 2 | 34 |

That is, a PSS may be generated based on a root index that is selected from among 25, 29, and 34. In Table 1, $N^{(2)}_{ID}$ that determines a root index may be selected based on a PCID of an eNB that transmits a PSS.

Mapping a sequence to a resource element may be determined based on a frame structure. A UE may determine that a PSS is not transmitted together with a downlink reference signal through the same antenna port. Also, the UE estimates that a transmission instance of a PSS and a transmission instance of another PSS are not transmitted through the same antenna port.

A sequence d(n) used for the PSS may be mapped to a resource element based on Equation 2.

$$a_{k,l} = d(n), \quad n = 0, \ldots, 61 \qquad k = n - 31 + \frac{N_{RB}^{DL} N_{sc}^{RB}}{2} \quad \text{[Equation 2]}$$

Here, $a_{k,l}$ denotes a resource element, k denotes a subcarrier number, and l denotes a symbol number. $N^{DL}_{RB}$ denotes the number of downlink resource blocks (RBs). (In the case of PC5-based V2X, $N^{DL}_{RB}$ denotes the number of sidelink resource blocks.) $N^{RB}_{SC}$ denotes the number of subcarriers in a single resource block.

In frame structure type 1, a PSS is mapped to the last OFDM symbols of slots 1 and 10. In frame structure type 2, a PSS is mapped to the last OFDM symbols of slots 1 and 6.

A resource element corresponding to Equation 3 from among resource elements (k, l) of OFDM symbols used for transmitting a PSS may not be used, but may be reserved for transmission of the PSS.

$$k = n - 31 + \frac{N_{RB}^{DL} N_{SC}^{RB}}{2} \qquad n = -5, -4, \ldots, -1, 62, 63, \ldots 66 \quad \text{[Equation 3]}$$

In addition, a sequence d(0), . . . ,d(61) used for an SSS may be generated based on an interleaved combination of two m-sequences having a length of 31, as defined in Equation 4 below. The sequence combination may be scrambled based on a scrambling sequence given by a PSS. The combination of two m-sequences having a length of 31, which defines the SSS, may have different values between a subframe 0 and a subframe 5, based on Equation 4.

[Equation 4]

$$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

In Equation 4, n is $0 \le n \le 30$, and an index m0 and an index m1 are values derived from a Physical Cell Identity Group (PCID group) $N^{(1)}_{ID}$ according to Equation 5 provided below.

[Equation 5]

$$m_0 = m' \bmod 31$$

$$m_1 = \left(m_0 + \lfloor m'/31 \rfloor + 1\right) \bmod 31$$

$$m' = N_{ID}^{(1)} + q(q+1)/2,$$

$$q = \left\lfloor \frac{N_{ID}^{(1)} + q'(q'+1)/2}{30} \right\rfloor,$$

$$q' = \lfloor N_{ID}^{(1)}/30 \rfloor$$

Here, $N^{(1)}_{ID}$ may be determined based on a PCID of an eNB that transmits the SSS. That is, the SSS may be determined based on the value of PCID group $N^{(1)}_{ID}$.

A result value of Equation 5 may be expressed as shown in Table 6.

TABLE 6

| $N^{(1)}_{ID}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |

TABLE 6-continued

| $N^{(1)}_{ID}$ | $m_0$ | $m_1$ |
|---|---|---|
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |

TABLE 6-continued

| $N^{(1)}_{ID}$ | $m_0$ | $m_1$ |
|---|---|---|
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Two sequences $s0^{(m0)}(n)$ and $s1^{(m1)}(n)$ may be defined as two different cyclic shifts of an m-sequence $\tilde{s}(n)$, based on Equation 6.

$$S_0^{(m_0)}(n) = \tilde{s}((n + m_0)\bmod 31) \qquad S_1^{(m_1)}(n) = \tilde{s}((n + m_1)\bmod 31) \quad \text{[Equation 6]}$$

Equation 6 satisfies $\tilde{s}(i)=1-2x(i)$ and $0 \le i \le 30$, and x(i) may be defined by Equation 7.

$$x(\bar{i}+5) = \left(x(\bar{i}+2) + x(\bar{i})\right)\bmod 2,\ 0 \le \bar{i} \le 25 \quad \text{[Equation 7]}$$

Here, an initial value of x(i) is set as x(0)=0, x(1)=0, x(2)=0, x(3)=0, and x(4)=1.

$c_0(n)$ and $c_1(n)$ which are two scrambling sequences may be determined based on a PSS, and may be defined by two different cyclic shifts of an m-sequence $\tilde{c}(n)$ based on Equation 8.

$$c_0(n) = \tilde{c}\left(\left(n + N_{ID}^{(2)}\right)\bmod 31\right) \qquad c_1(n) = \tilde{c}\left(\left(n + N_{ID}^{(2)} + 3\right)\bmod 31\right) \quad \text{[Equation 8]}$$

In Equation 8, $N^{(2)}_{ID} \varepsilon \{0,1,2\}$ is a physical layer ID in a physical-layer cell ID group (PCID group). Equation 8 satisfies $\tilde{c}(i)=1-2x(i)$ and $0 \le i \le 30$, and x(i) may be defined by Equation 9.

$$x(\bar{i}+5) = \left(x(\bar{i}+3) + x(\bar{i})\right)\bmod 2,\ 0 \le \bar{i} \le 25 \quad \text{[Equation 9]}$$

Here, an initial value of x(i) is set as x(0)=0, x(1)=0, x(2)=0, x(3)=0, and x(4)=1.

Scrambling sequences $z_1^{(m0)}(n)$ and $z_1^{(m1)}(n)$ are defined by a cyclic shift of an m-sequence $\tilde{z}(n)$ based on Equation 10.

$$z_1^{(m_0)}(n) = \tilde{z}((n + m_0 \bmod 8))\bmod 31) \qquad z_1^{(m_1)}(n) = \tilde{z}((n + m_1 \bmod 8))\bmod 31) \quad \text{[Equation 10]}$$

In Equation 10, $m_0$ and $m_1$ may be obtained through Table 2, and satisfy and $\tilde{z}(i)=1-2x(i)$ and $0 \le i \le 30$. x(i) may be defined by Equation 11.

$$x(\bar{i}+5) = \left(x(\bar{i}+4) + x(\bar{i}+2) + x(\bar{i}+1) + x(\bar{i})\right)\bmod 2,\quad 0 \le \bar{i} \le 25 \quad \text{[Equation 11]}$$

Here, an initial condition of x(i) is set as x(0)=0, x(1)=0, x(2)=0, x(3)=0, and x(4)=1.

A sequence d(n) used for the SSS may be mapped to a resource element based on Equation 12.

$$a_{k,l} = d(n), \quad n = 0, \ldots, 61, \quad k = n - 31 + \frac{N_{RB}^{DL} N_{sc}^{RB}}{2}, \quad l = \begin{cases} N_{symb}^{DL} - 2 & \text{in slots 0 and 10 for frame structure type1} \\ N_{symb}^{DL} - 1 & \text{in slots 1 and 11 for frame structure type2} \end{cases} \quad \text{[Equation 12]}$$

Here, $a_{k,l}$ denotes a resource element, k denotes a subcarrier number, and l denotes a symbol number. $N^{DL}_{RB}$ denotes the number of downlink resource blocks (RBs). (In the case of PC5-based V2X, $N^{DL}_{RB}$ denotes the number of sidelink resource blocks.) $N^{RB}_{SC}$ denotes the number of subcarriers in a single resource block.

A resource element corresponding to Equation 13 from among resource elements (k, l) in symbols may not be used but for transmission of an SSS.

$$k = n - 31 + \frac{N_{RB}^{DL} N_{sc}^{RB}}{2} \qquad \text{[Equation 13]}$$

$$l = \begin{cases} N_{symb}^{DL} - 2 & \text{in slots 0 and 10} \quad \text{for frame structure type1} \\ N_{symb}^{DL} - 1 & \text{in slots 1 and 11} \quad \text{for frame structure type2} \end{cases}$$

$$n = -5, -4, \ldots, -1, 62, 63, \ldots 66$$

As described above, $s_0^{(m0)}(n)$ and $s_1^{(m1)}(n)$, $c_0(n)$ and $c_1(n)$, and $z_1^{(m0)}(n)$ and $z_1^{(m1)}(n)$ are m-sequences each having a length of 31. Through the above, only 168 sequences (out of the possible sequences that may be generated based on the m-sequences having a length of 31 based on Equation 4) may be used for generating the SSS. $N^{(1)}_{ID}$ is an integer in the range from 0 to 167, and each integer may correspond to one of the 168 sequences.

An eNB may generate a PSS/SSS based on $N^{(2)}_{ID}$ and $N^{(1)}_{ID}$ corresponding to an allocated PCID. A UE may obtain $N^{(2)}_{ID}$ based on a PSS received from an eNB, and also may obtain $N^{(1)}_{ID}$ based on an SSS received from the eNB. The UE may determine a PDID of the eNB as $N^{cell}_{ID}=3N^{(1)}_{ID}+N^{(2)}_{ID}$. That is, the UE may obtain the PCID of the eNB based on the received PSS/SSS in the LTE system.

Subsequently, an SLSS will be described in detail.

First, a PSSS will be described in detail.

$$N_{ID}^{SL}$$

indicates a physical-layer sidelink synchronization identity, and has a relationship of $$N_{ID}^{SL} \in \{0, 1, \ldots, 335\}.$$

$$N_{ID}^{SL}$$

may be divided into id_net and id_oon, which are two sets that include identities {0,1, . . . ,167} and {168, 169, . . . ,335}, respectively.

The PSSS is transmitted through two adjacent SC_FDMA symbols in the same subframe. Each of the two sequences $d_i(0)$, . . . ,$d_i(61)$,i=1,2 used for the PSSS in the two SC-FDMA symbols is given by Equation 1. A root index u is 26 when $$N_{ID}^{SL} \le 167$$

is satisfied. Otherwise, the root index u is 37.

A sequence $d_i(n)$ may be multiplied by an amplitude scaling factor $\sqrt{72/\beta}\cdot\beta_{PSBCH}$ and may be mapped to a resource element on an antenna port 1020 according to Equation 14.

$$a_{k,l} = d_i(n), \qquad \text{[Equation 14]}$$

$$n = 0, \ldots, 61$$

$$k = n - 31 + \frac{N_{RB}^{SL} N_{sc}^{RB}}{2}$$

$$l = \begin{cases} 1, 2 & \text{normal cyclic prefix} \\ 0, 1 & \text{extended cyclic prefix} \end{cases}$$

Subsequently, an SSSS will be described.

The SSSS is transmitted through two adjacent SC FDMAs in the same subframe. Two sequences $d_i(0)$, . . . , $d_i(61)$,i=1,2 used for the SSSS may be given by $$N_{ID}^{(1)} = N_{ID}^{SL} \bmod 168$$

and 168 and Equation 4.

A sequence $d_i(n)$ may be multiplied by an amplitude scaling factor $\beta_{SSSS}$, and may be mapped to a resource element on the antenna port 1020 in the second slot of a subframe according to Equation 15.

$$a_{k,l} = d_i(n), \qquad \text{[Equation 15]}$$

$$n = 0, \ldots, 61$$

$$k = n - 31 + \frac{N_{RB}^{SL} N_{sc}^{RB}}{2}$$

$$l = \begin{cases} 4, 5 & \text{normal cyclic prefix} \\ 3, 4 & \text{extended cyclic prefix} \end{cases}$$

A PSS/SSS is a synchronization signal transmitted from an eNB. In the case of a PSS, a PSS is configured using one of the three root index values (u=25, 29, and 34; a parameter for the three values is $N^{(2)}_{ID}$) based on a PCID of the eNB. In the case of an SSS, $m_o$ and $m_1$ values as shown in Table 6 may be determined from one of the 168 integer values in the range of 0 to 167 (a parameter for 168 values is $N^{(1)}_{ID}$), and the SSS is configured from the $m_0$ and $m_1$ values. A PSS is transmitted in two predetermined subframes with a period of 10 ms, and a single symbol is used in each subframe. An SSS is also transmitted in two predetermined subframes with a period of 10 ms, and a single symbol is used in each subframe.

An SLSS (PSSS/SSSS) is a synchronization signal transmitted from a UE. In the case of the PSSS, a sequence is configured based on the Zadoff-Chu sequence, in the same manner of a PSS configuration. In the case of the SSSS, the basic sequence configuration method of the SLSS complies with the above described PSS/SSS sequence generating method, i.e., a method for configuring a sequence based on an interleaved combination of two m-sequences having a length of 31, in the same manner as an SSS, except for some points described below.

Particularly, in the case of the PSSS out of the SLSS according to an embodiment of the present disclosure, the PSSS is configured using one of two root index values (u=26, 37; a parameter associated with two values corresponds to $N^{(2)}_{ID}$), unlike a PSS. The PSSS may be configured to be different based on whether a PSSID $N^{SL}_{ID}$ belongs to id_net or id_oon (this may be expressed through the equation $$N_{ID}^{(2)} = \lfloor N_{ID}^{SL} / 168 \rfloor).$$

In the case of the SSSS out of the SLSS, $m_o$ and $m_1$ values as shown in Table 6 may be determined from a value out of 168 integer values in the range of 0 to 167 (a parameter associated with 168 values corresponds to $N^{(1)}_{ID}$) in the same manner as an SSS, and the SSSS is configured from the $m_o$ and $m_1$ values. In this instance, $N^{(1)}_{ID}$ for the SSSS may be determined from the equation $$N_{ID}^{(1)} = N_{ID}^{SL} \bmod 168.$$

Figure 5:
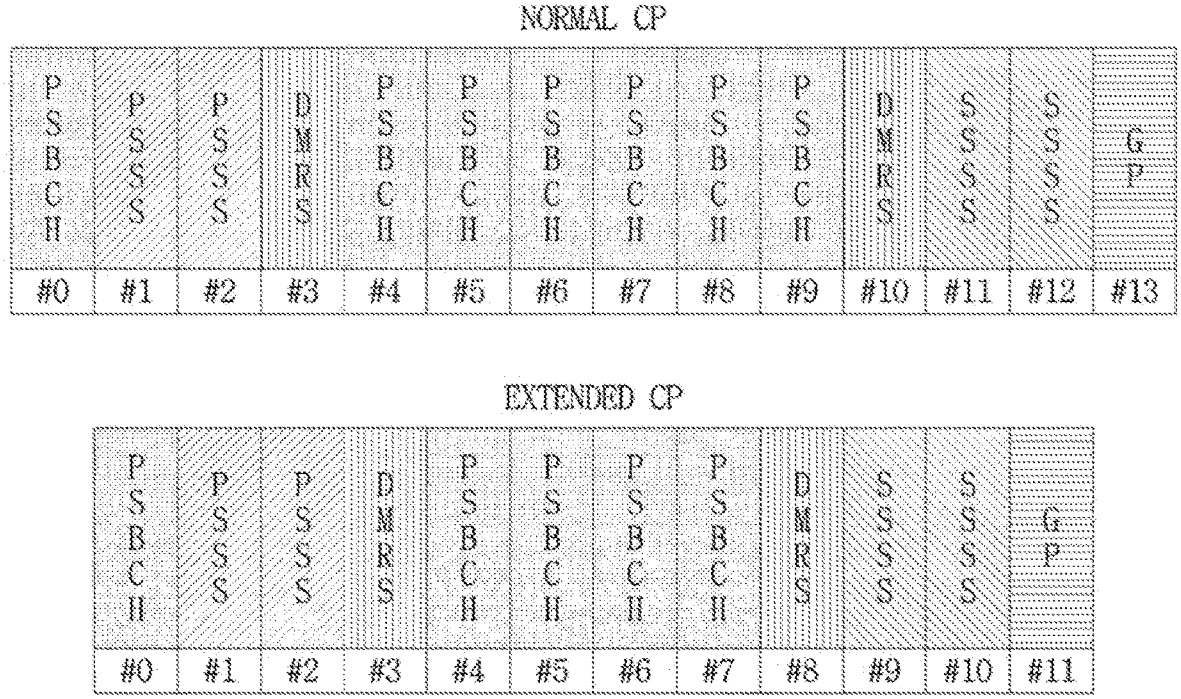
FIG. 5 and FIG. 6 are conceptual diagrams illustrating mapping of a synchronization signal to a physical resource for V2X communication according to an embodiment of the present disclosure.
Figure 6:
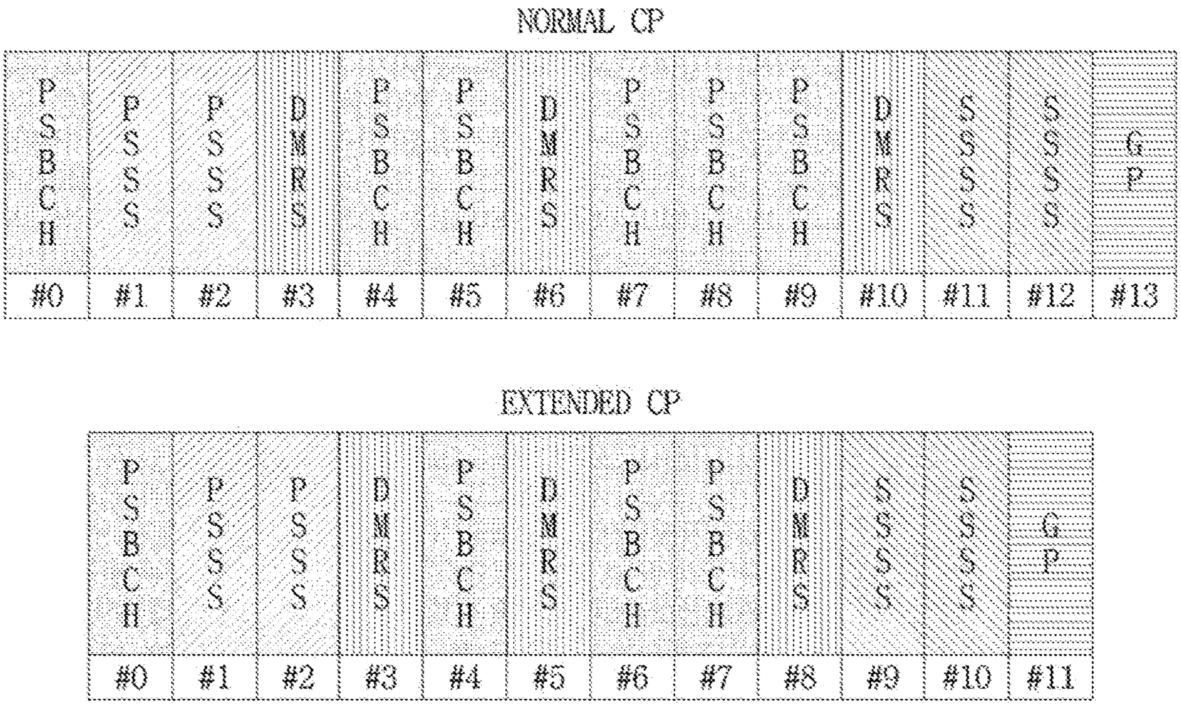

Here, unlike the PSS/SSS, the PSSS/SSSS of the SLSS is mapped to two symbols in a single subframe based on a period of 40 ms, as illustrated in FIGS. 5 and 6. The same sequences may be used for two symbols (1, 2 for Normal CP and Extended CP) for the PSSS and two symbols (11, 12 for Normal CP and 9, 10 for Extended CP) for the SSSS.

A UE in the PC5 link-based D2D receives synchronization signals from a plurality of synchronization sources, selects one of the received synchronization signals as its own synchronization (that is, its own time reference), and transmits a synchronization corresponding to the time reference as an SLSS (PSSS and SSSS) which is a synchronization signal. In this instance, the UE selects its own synchronization (that is, its own time reference) out of the synchronization signals received from the plurality of synchronization sources, based on priority provided below. A synchronization signal having a high transmission power, that is, a synchronization signal having the highest S-RSRP result, may be selected when synchronization signals have the same priority.

① A synchronization signal transmitted from an eNB

That is, the synchronization source is an eNB.

In this instance, a synchronization signal is a PSS/SSS. A root index value u of the PSS is one of 25, 29, and 34. It is recognized that a synchronization source is an eNB through the root index value.

② synchronization signal transmitted from an in-coverage UE

That is, the synchronization source is an in-coverage UE.

In this instance, a synchronization signal is transmitted from the in-coverage UE and thus, the field value of a coverage indicator transmitted through a PSBCH is 1.

In this instance, the UE transmits an SLSS based on an eNB timing. Thus, a PSSID is an ID belonging to in_net defined for in-coverage communication (e.g., the root index value u of a PSSS may be 26).

③ A synchronization signal transmitted from an out-of-coverage UE, and the PSSID is an ID belonging to id_net That is, the synchronization source is an out-of-coverage UE.

In this instance, a synchronization signal is transmitted from the out-of-coverage UE and thus, the field value of a coverage indicator transmitted through a PSBCH is 0.

In this instance, the UE transmits an SLSS based on an eNB timing and thus, a PSSID is an ID belonging to id_net defined for in-coverage communication (e.g., the root index value u of a PSSS may be 26).

④ A synchronization signal transmitted from an out-of-coverage UE, and the PSSID is an ID belonging to id_oon That is, the synchronization source is an out-of-coverage UE.

In this instance, a synchronization signal is transmitted from the out-of-coverage UE and thus, the field value of a coverage indicator transmitted through a PSBCH is 0.

In this instance, the UE transmits an SLSS based on a UE timing of another UE and thus, a PSSID is an ID belonging to id_oon defined for out-of-coverage UEs (e.g., the root index value u of a PSSS may be 37).

⑤ When a UE fails to select a synchronization signal corresponding to ① through ④, the UE autonomously acts as a synchronization source and transmits a synchronization signal.

The UE randomly generates a PSSID belonging to id_oon defined for out-of-coverage UEs through uniform distribution, generates a synchronization signal through the same, and transmits the same.

Figure 7:
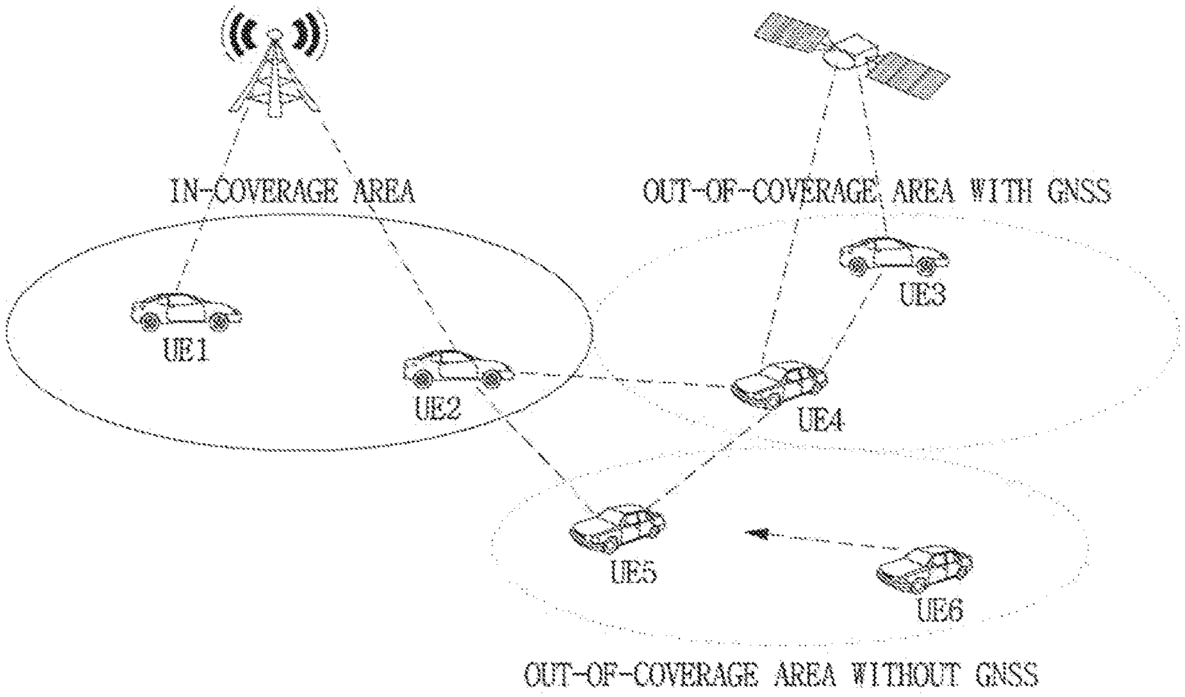
FIG. 7 is a conceptual diagram illustrating the flow of a synchronization signal in V2X communication according to an embodiment of the present disclosure.

However, V2X may perform synchronization according to a Global Navigation Satellite System (GNSS) or a GNSS-equivalent device, as illustrated in FIG. 7. That is, according to an embodiment of the present disclosure, a synchronization source may consider a GNSS or a GNSS-equivalent device, in addition to an eNB or a UE.

According to an embodiment of the present disclosure, the following cases may be further considered.

ⓐ A synchronization signal transmitted from a GNSS or a GNSS-equivalent device

That is, the synchronization source is a GNSS or a GNSS-equivalent device.

ⓑ A UE that transmits an SLSS which is based on the timing of a GNSS or a GNSS-equivalent device That is, the synchronization source is a UE.

The UE may be classified in two levels.

ⓑ-1: A UE that receives a synchronization signal directly from a GNSS or a GNSS-equivalent device and transmits an SLSS.

ⓑ-2: A UE that receives a synchronization signal from a UE corresponding to b-1 and transmits an SLSS.

As described above, a UE in the PC5-based D2D considers the priority corresponding to ① through ⑤ when selecting a time reference from among synchronization signals received from a plurality of synchronization sources, and when transmitting a synchronization signal. In the same manner as the above, V2X considers the priority corresponding to ① through ⑤, and considers the priority corresponding to ⓐ and ⓑ (or ⓑ-1 and ⓑ-2) by additionally taking the GNSS or the GNSS-equivalent device into account. Overall, V2X may consider the priority shown in Table 7, as provided below. Although Table 7 lists five cases, the priority of V2X synchronization sources may not be limited thereto.

TABLE 7

| V2X synchronization source priority | |
|---|---|
| Case 1 | ⓐ > (①>)ⓑ − 1 > ②② > ⓑ − 2 > ③ > ④ > ⑤ |
| Case 2 | ⓐ > (①>)ⓑ − 1 = ② > ⓑ − 2 = ③ > ④ > ⑤ |
| Case 3 | ⓐ > (①>)ⓑ > ② > ③ > ④ > ⑤ |
| Case 4 | ⓐ > (①>)ⓑ = ② > ③ > ④ > ⑤ |
| Case 5 | ⓐ > ① > ② > ③ > ⓑ > ④ > ⑤ |

In Table 7, ① is considered only when a UE exists in an in-coverage environment (i.e., existing in an eNB network). Otherwise, ① is not considered.

In an instance of case 1, an SLSS transmitted from an out-of-coverage UE that is directly synchronized by a GNSS (or a GNSS-equivalent device having sufficient reliability), is distinguished from an SLSS transmitted from a UE that has a coverage indicator with a field value of 1, and has a PSSID belonging to SLSS_net. This case may be included in the example 'ⓑ-1>②'.

In an instance of case 2, an SLSS may be transmitted from an in-coverage UE that is directly synchronized by a GNSS (or a GNSS-equivalent device having sufficient reliability), has the same priority as an SLSS transmitted from a UE that has a coverage indicator with a field value of 1, and has a PSSID belonging to SLSS_net. This case may be included in the example 'ⓑ-1=②'.

According to the priority, a GNSS (or a GNSS-equivalent device: GNSS indicates a GNSS or a GNSS-equivalent device) always has a higher priority than an eNB. The priority must belong to a GNSS in an area where an eNB does not exist, and in an area where an eNB exists and sets a synchronization signal based on a GNSS, the GNSS has more accurate synchronization information when a predetermined error is considered. The present disclosure also considers that a smaller number of hops are used when a synchronization signal is transmitted from an initial synchronization source (eNB, GLSS, or UE).

In the cases described above, according to the priority when considering of a newly added GNSS, a UE may need to identify a synchronization source for each synchronization signal when synchronization signals are transmitted from a plurality of synchronization sources. Accordingly, the present disclosure proposes a method of generating a synchronization signal based on a GNSS timing to be distinguished according to the priority. That is, the UE needs to distinguish synchronization signals generated in case ⓑ (or ⓑ-1 and ⓑ-2), which directly selects a synchronization signal from a GNSS and transmits a synchronization signal based on GNSS timing, from synchronization signals generated in cases ① through ⑤.

The present disclosure proposes a method of generating a synchronization signal in consideration of the above. Also, when two cases ⓑ-1 and ⓑ-2 are taken into consideration, the present disclosure provides a method of distinguishing synchronization signals generated from the two cases. In addition, for ease of description, the case of synchronization by ② and ③ is referred to as an 'eNB timing-based synchronization' case, and the case of synchronization by ④ and ⑤ is referred to as a 'UE timing-based synchronization' case. Also, the case of synchronization by ⓑ (or ⓑ-1 and ⓑ-2) is referred to as a 'GNSS timing-based synchronization' case.

Embodiment 1

Embodiment 1: the case of taking into consideration a GNSS timing-based synchronization signal transmission ⓑ.

1) When GNSS timing-based synchronization case ⓑ is taken into consideration, a primary synchronization signal (i.e., a PSS or PSSS) generated in each case may be distinguished as follows.

In case ①: one of root indices of 25, 29, and 34 is used for a PSS.

In case ② or ③ (i.e., the eNB timing-based synchronization case): a root index of 26 is used for a PSSS.

In case ④ or ⑤ (i.e., the UE timing-based synchronization case): a root index of 37 is used for a PSSS.

Case ⓑ (i.e., the GNSS timing-based synchronization case): For the synchronization based on an eNB timing or a UE timing, a root index of 26 or 37 may be used for a PSSS. In case 3, 4, and 5 of Table 7, ⓑ may always have a higher priority than the UE timing-based synchronization case (i.e., ④ or ⑤), and also, the eNB timing-based synchronization case (i.e., ② or ③) always has a higher priority than the UE timing-based synchronization case (i.e., ④ or ⑤). Accordingly, the GNSS timing-based synchronization case (i.e., ⓑ) may also consider using the same index as the eNB timing-based synchronization case (i.e., ② or ③). That is, in case ⓑ, a root index of 26 may be used for a PSSS, in the same manner as ② or ③.

In this instance, a root index value applied to the GNSS timing-based synchronization case may have a value different from the root index value that the eNB applied to the synchronization case (i.e., ①) and different from the UE timing-based synchronization case, and thus, their primary synchronization signals (i.e., a PSS or PSSS) may be distinguished from one another. However, the root index value applied to the GNSS timing-based synchronization case is the same as the root index value applied to the eNB timing-based synchronization case, and thus, their primary synchronization signals (i.e., PSSS) may not be distinguishable from each other. Accordingly, the GNSS timing-based synchronization case and the eNB timing-based synchronization case may need to be distinguished by additionally using a secondary synchronization signal (SSSS).

2) When GNSS timing-based synchronization case ⓑ is taken into consideration, a secondary synchronization signal (i.e., SSS or SSSS) generated in each case may be distinguished as follows.

In case ② or ③ (i.e., the eNB timing-based synchronization case):

one of {0,1, . . . ,167}, which correspond to id_net from among $$N_{ID}^{SL} \in \{0, 1, \ldots, 335\},$$

may be used as a PSSID. Therefore, $N^{(2)}_{ID}$ may be determined as follows.

$$N_{ID}^{(1)} = N_{ID}^{SL} \bmod 168$$

$$N_{ID}^{(2)} = \lfloor N_{ID}^{SL}/168 \rfloor = 0$$

An SSSS may be mapped to two symbols in an SLSS transmission subframe. In this instance, a mapping scheme of the SSSS with respect to each symbol may comply with a mapping scheme on subframe 0 from among two mapping schemes that have been described with reference to Equation 4. The mapping scheme on subframe 0 may be defined by Equation 16. In this instance, indices $m_0$ and $m_1$ may be interleaved and mapped to each subcarrier in order from $m_o$ to $m_1$.

$$d(2n) = s_0^{(m_0)}(n)c_0(n) \qquad \text{[Equation 16]}$$

$$d(2n+1) = s_1^{(m_1)}(n)c_1(n)z_1^{(m)}(n)$$

In case ④ or ⑤ (i.e., the UE timing-based synchronization case):

one of {168,169, . . . ,335}, which correspond to id_oon from among $$N_{ID}^{SL} \in \{0, 1, \ldots , 335\},$$

may be used as a PSSID. Therefore, $N^{(2)}_{ID}$ may be determined as follows.

$$N_{ID}^{(1)} = N_{ID}^{SL} \bmod 168$$

$$N_{ID}^{(2)} = \lfloor N_{ID}^{SL}/168 \rfloor = 1$$

An SSSS may be mapped to two symbols in an SLSS transmission subframe. In this instance, a mapping scheme of the SSSS with respect to each symbol may comply with a mapping scheme on subframe 0 from among two mapping schemes that have been described with reference to Equation 4. In this instance (see Equation 16), indices $m_0$ and $m_1$ may be interleaved and mapped to each subcarrier in order from $m_0$ to $m_1$.

In case ⓑ (i.e., the GNSS timing-based synchronization case):

one of {0,1, . . . ,335}, which correspond to id_net from among $$N_{ID}^{SL} = \{0, 1, \ldots , 335\},$$

may be used as a PSSID. Therefore, $N^{(2)}_{ID}$ may be determined as follows.

$$N_{ID}^{(1)} = N_{ID}^{SL} \bmod 168$$

$$N_{ID}^{(2)} = \lfloor N_{ID}^{SL} / 168 \rfloor = 1$$

An SSSS may be mapped to two symbols in an SLSS transmission subframe. In this instance, a mapping scheme of the SSSS with respect to each symbol may comply with a mapping scheme on subframe 5 from among two mapping schemes that have been described with reference to Equation 4. The mapping scheme on subframe 5 may be defined by Equation 17 as provided below. In this instance, indices $m_0$ and $m_1$ may be interleaved and mapped to each subcarrier in order from $m_1$ to $m_0$.

$$d(2n) = s_1^{(m_1)}(n)c_0(n) \qquad \text{[Equation 17]}$$

$$d(2n+1) = s_0^{(m_0)}(n)c_1(n)z_1^{(m_1)}(n)$$

As described in Table 6, $m_0<m_1$. Accordingly, in association with a binary sequence having a length of 31 (length-31 binary sequence), which is mapped to even-numbered subcarriers and is transmitted, and a binary sequence having a length of 31, which is mapped to odd-numbered subcarriers and is transmitted, whether the binary sequences respectively comply with indices $m_0$ and $m_1$ (i.e., the mapping scheme on subframe 0 from among two SSS mapping schemes) and whether the binary sequences respectively comply with indices $m_1$ and $m_0$ (i.e., the mapping scheme on subframe 5 from among the two SSS mapping schemes) may be distinguished.

As described above, an SSSS for each case may be distinguished by setting different mapping schemes for the GNSS timing-based synchronization case (i.e., ⓑ) and the eNB timing-based synchronization case (i.e., ② and ③).

Embodiment 2

Embodiment 2: the case of taking into consideration a GNSS timing-based synchronization signal transmission ⓑ-1 and ⓑ-2

1) When the GNSS timing-based synchronization case ⓑ is taken into consideration, a primary synchronization signal (i.e., a PSS or PSSS) generated in each case may be distinguished as follows.

In case ①: one of root indices of 25, 29, and 34 is used for a PSS.

In case ② or ③ (i.e., the eNB timing-based synchronization case): a root index of 26 is used for a PSSS.

In case ④ or ⑤ (i.e., the UE timing-based synchronization case): a root index of 37 is used for a PSSS.

In case ⓑ (i.e., the GNSS timing-based synchronization case): For synchronization based on an eNB timing or a UE timing, a root index of 26 or 37 may be used for a PSSS. In cases 1 and 2 of Table 7, it is recognized that ⓑ-1 and ⓑ-2 always have a higher priority than the UE timing-based synchronization case (i.e., ④ or ⑤), and also, the eNB timing-based synchronization case (i.e., ② or ③) always has a higher priority than the UE timing-based synchronization case (i.e., ④ or ⑤). Accordingly, the GNSS timing-based synchronization case (i.e., ⓑ-1 or ⓑ-2) may also consider using the same index as the eNB timing-based synchronization case (i.e., ② or ③). That is, in case ⓑ-1 or ⓑ-2, a root index of 26 may be used for a PSSS, in the same manner as ② or ③.

In this instance, a root index value applied to the GNSS timing-based synchronization case may have a value different from the root index value applied to a synchronization case by an eNB (i.e., ①) or from the UE timing-based synchronization case (④ or ⑤), and thus, their primary synchronization signals (i.e., a PSS or PSSS) may be distinguished from one another. However, a root index value applied to the GNSS timing-based synchronization case is the same as the root index value applied to the eNB timing-based synchronization case, and thus, their synchronization signals (i.e., a PSSS) may not be distinguished from one another. Accordingly, the GNSS timing-based synchronization case and the eNB timing-based synchronization case may need to be distinguished by additionally using a secondary synchronization signal (SSSS).

2) When the GNSS timing-based synchronization cases ⓑ-1 and ⓑ-2 are taken into consideration, a secondary synchronization signal (i.e., SSS or SSSS) generated in each case may be distinguished as follows.

In case ② or ③ (i.e., the eNB timing-based synchronization case):

one of {0,1, . . . ,167}, which corresponds to id_net from among $$N_{ID}^{SL} \in \{0, 1, \ldots , 335\},$$

may be used as a PSSID. Therefore, $N^{(2)}_{ID}$ may be determined as follows.

$$N_{ID}^{(1)} = N_{ID}^{SL} \bmod 168$$

$$N_{ID}^{(2)} = \lfloor N_{ID}^{SL}/168 \rfloor = 0$$

An SSSS may be mapped to two symbols in an SLSS transmission subframe. In this instance, a mapping scheme of the SSSS with respect to each symbol may comply with a mapping scheme on subframe 0 from among two mapping schemes that have been described with reference to Equation 4. In this instance (see Equation 16), indices $m_0$ and $m_1$ may be interleaved and mapped to each subcarrier in order from $m_0$ to $m_1$.

In case ④ or ⑤ (i.e., the UE timing-based synchronization case):

one of {168,169, . . . ,335}, which corresponds to id_oon from among $$N_{ID}^{SL} \in \{0, 1, \ldots , 335\},$$

may be used as a PSSID. Therefore, $N^{(2)}_{ID}$ may be determined as follows.

$$N_{ID}^{(1)} = N_{ID}^{SL} \bmod 168$$

$$N_{ID}^{(2)} = \lfloor N_{ID}^{SL}/168 \rfloor = 1$$

An SSSS may be mapped to two symbols in an SLSS transmission subframe. In this instance, a mapping scheme of the SSSS with respect to each symbol may comply with a mapping scheme on subframe 0 from among two mapping schemes that have been described with reference to Equation 4. In this instance (see Equation 16), indices $m_0$ and $m_1$ may be interleaved and mapped to each subcarrier in order from $m_0$ to $m_1$.

In case ⓑ-1 and ⓑ-2 (i.e., the GNSS timing-based synchronization case):

one of {0,1, . . . ,335}, which corresponds to id_net from among $$N_{ID}^{SL} \in \{0, 1, \ldots , 335\},$$

may be used as a PSSID. Therefore, $N^{(2)}_{ID}$ may be determined as follows.

$$N_{ID}^{(1)} = N_{ID}^{SL} \bmod 168$$

$$N_{ID}^{(2)} = \lfloor N_{ID}^{SL}/168 \rfloor = 0$$

An SSSS may be mapped to two symbols in an SLSS transmission subframe. In this instance, a mapping scheme of the SSSS with respect to each symbol may comply with a mapping scheme on subframe 5 from among two mapping schemes that have been described with reference to Equation 4. In this instance (see Equation 17), indices $m_0$ and $m_1$ may be interleaved and mapped to each subcarrier in order from $m_1$ to $m_0$.

As described in Table 6, $m_0<m_1$. Accordingly, in association with a binary sequence having a length of 31 (length-31 binary sequence) which is mapped to even-numbered subcarriers and is transmitted, and a length-31 binary sequence which is mapped to odd-numbered subcarriers and is transmitted, the binary sequences may be distinguished based on whether they respectively comply with indices $m_0$ and $m_1$ (i.e., the mapping scheme on subframe 0 from among two SSS mapping schemes) or whether they respectively comply with indices $m_1$ and $m_0$ (i.e., the mapping scheme on subframe 5 from among the two SSS mapping schemes).

As described above, an SSSS for each case may be distinguished by setting different mapping schemes for the GNSS timing-based synchronization case (i.e., ⓑ-1 and ⓑ-2) and the eNB timing-based synchronization case (i.e., ② and ③).

ⓑ-1 and ⓑ-2 may be distinguished by a field value of a coverage indicator transmitted through a PSBCH.

For example, in case ⓑ-1, the field value of a coverage indicator transmitted through a PSBCH may have a value of 1. In case ⓑ-2, the field value of a coverage indicator transmitted through a PSBCH may have a value of 0.

Figure 8:
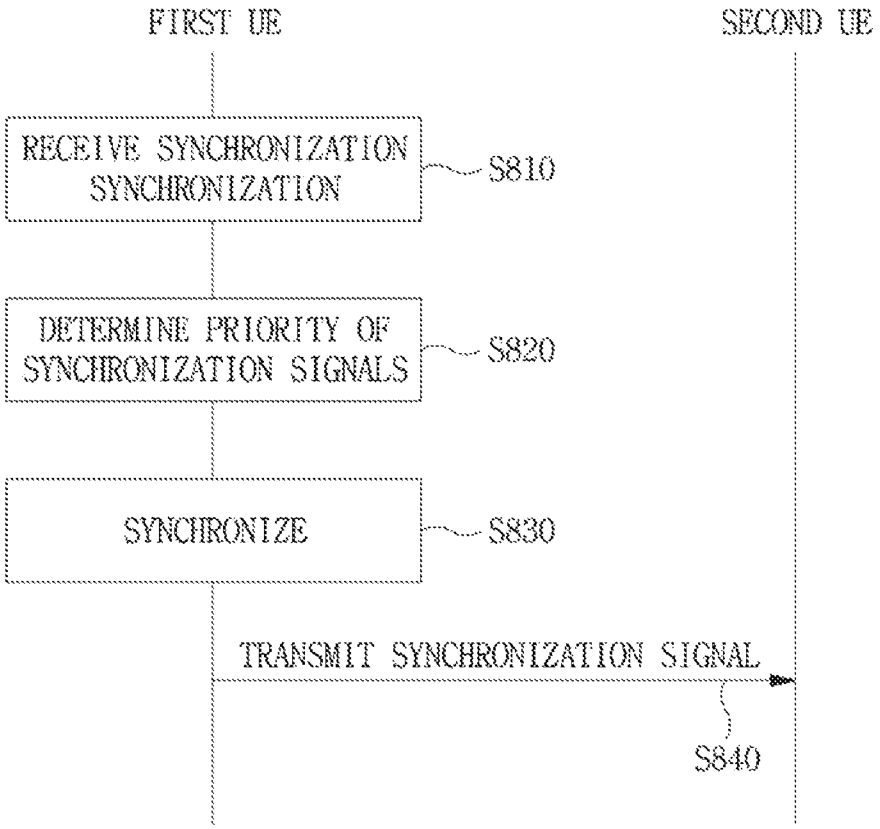
FIG. 8 is a signal flowchart illustrating a process of selecting a synchronization signal according to an embodiment of the present disclosure.

FIG. 8 is a diagram illustrating one method of selecting a synchronization signal according to the present disclosure.

The example in FIG. 8 may be applied to synchronization between a passive synchronization source and a synchronization target UE. In FIG. 8, it is assumed that a first UE is a passive synchronization source, and a second UE is a synchronization target UE.

In operation S810, the first UE receives at least one synchronization signal from an external source. For example, the first UE may receive a synchronization signal from an active synchronization source (such as an eNB, a GNSS, another UE, or the like) or from another passive synchronization source (which is synchronized by an active synchronization source).

The synchronization signal received by the first UE may include a primary synchronization signal (i.e., a PSS or PSSS) and a secondary synchronization signal (i.e., a SSS or SSSS), and they may be generated according to the methods which have been described in the embodiment 1 and the embodiment 2.

When a plurality of synchronization signals are received, the first UE determines the priority of the plurality of signals based on a root index of the received synchronization signal in operation S820. For example, the first UE may determine the priority of synchronization signals according to one of the cases 1 through 5, which have been described in Table 6.

When the root indices are the same (e.g., a GNSS timing-based synchronization signal and an eNB timing-based synchronization signal may have the same root index value of 26), the priority may be determined based on an index sequence associated with a binary sequence of an SSSS.

In addition, a field value of a coverage indicator of a PSBCH may be used for determining the priority.

In operation S830, the first UE performs synchronization based on the synchronization signal with the highest priority.

In operation S840, the first UE transmits the synchronization signal selected in operation S830 to a second UE.

Although the above described illustrative methods are expressed as a series of operations for ease of description, they may not limit the order of operations executed, and the operations may be executed in parallel or in a different order. Also, all of the operations described above may not always be required to implement the method of the present disclosure.

The above described embodiments may include examples of various aspects of the present disclosure. Although it is difficult to describe all the possible combinations showing the various aspects, other combinations are possible. Therefore, it should be understood that the present disclosure includes other substitutions, corrections, and modifications belonging to the scope of claims.

The scope of the present disclosure includes an apparatus that processes or implements the operations according to various embodiments of the present disclosure (e.g., a wireless device and elements thereof, which will be described with reference to FIG. 9).

Figure 9:
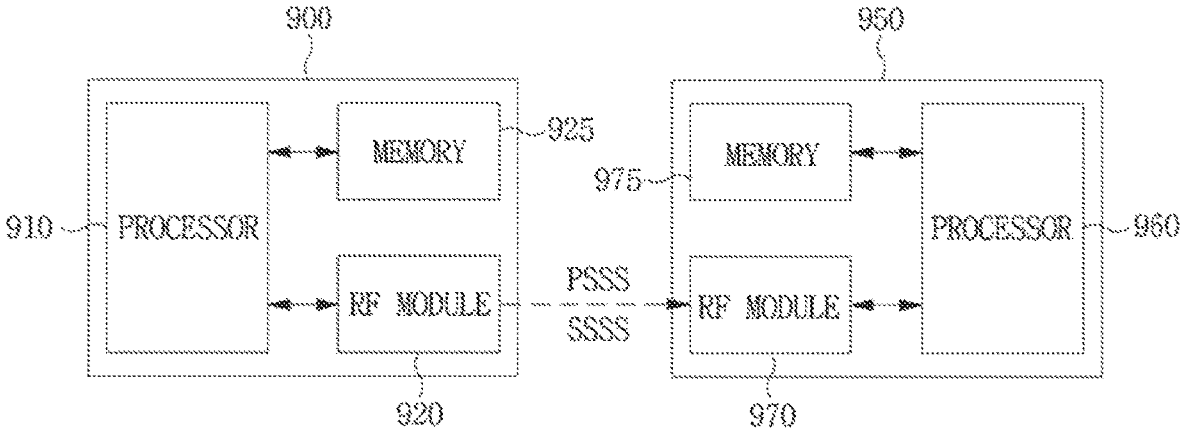
FIG. 9 is a block diagram schematically illustrating an apparatus according to an embodiment of the present disclosure.

FIG. 9 is a block diagram schematically illustrating an apparatus according to an embodiment of the present disclosure.

Referring to FIG. 9, a first communication device 900 and a second communication device 950 execute V2X communication. Here, the communication device may be a V2X UE that performs V2X communication.

The first communication device 900 includes a processor 910, an RF unit 920, and a memory 925.

The processor 910 may include a sequence generating unit and a sequence mapping unit. The sequence generating unit generates a sequence and determines the generated sequence. The sequence mapping unit maps a sequence generated from the sequence generating unit, and determines mapping. The processor 910 may implement the functions, processes, and/or methods proposed in the present specifications. Particularly, the processor 910 may perform all operations of a V2X UE of FIG. 3 through FIG. 7 disclosed in the present specification, and may perform the operation of generating a sequence corresponding to a PSSS and an SSSS and mapping the sequence according to an embodiment. In addition, the processor 910 determines the priority of the plurality of synchronization signals, performs synchronization based on a synchronization signal taking precedence, and transmits the synchronization signal based on the same.

Particularly, the processor 910 determines at least one synchronization signal received through the RF module 920. In this instance, in association with the synchronization signal, the processor determines whether an original synchronization source (or active synchronization source) is an eNB, a UE, or a GNSS/GNSS-equivalent. That is, the processor determines whether the synchronization signal corresponds to ① a synchronization signal transmitted from an eNB; ② a synchronization signal transmitted from an in-coverage UE ③ a synchronization signal transmitted from an out-of-coverage UE where a PSSID is an ID belonging to id_net; ④ a synchronization signal transmitted from an out-of-coverage UE where a PSSID is an ID belonging to id_oon; or a case in which a synchronization signal corresponding to ① through ④, or ⓐ or ⓑ (or ⓑ-1 and/or ⓑ-2) is not selected (i.e., a case in which a UE itself acts as a synchronization source and transmits a synchronization signal). Also, according to the present disclosure, it is further determined whether the synchronization signal corresponds to ⓐ a synchronization signal transmitted from a GNSS or a GNSS-equivalent device; or ⓑ (or ⓑ-1 and/or ⓑ-2) a signal transmitted from a UE that transmits an SLSS, which is based on a GNSS/GNSS-equivalent device timing.

To this end, the processor 910 may determine a root index through a PSS or PSSS sequence of at least one received synchronization signal. For example, in case ①, it may be determined whether a root index is one of 25, 29, and 34 used for a PSS. For case and a case that does not correspond to ① to ④, and ⓐ or ⓑ (or ⓑ-2), it may be determined that a root index is 37. For case ②, ③ or ⓑ (or ⓑ-1 and/or ⓑ-2), it may be determined that a root index for a PSSS is 26.

Also, the processor 910 may determine at least one SSSS sequence to distinguish ②, ③ and ⓑ (or ⓑ-1 and/or ⓑ-2). Through the above, $N^{(1)}_{ID}$ may be determined. Through the $N^{(1)}_{ID}$ value and a $N^{(2)}_{ID}$ value corresponding to a root index determined through the PSSS sequence, a PSSID may be determined. In cases ② and ③, a subframe 0 scheme may be used for mapping an SSSS to an SLSS subframe. In case ⓑ (or ⓑ-1 or ⓑ-2), a subframe 5 scheme may be used for mapping an SSSS to an SLSS subframe.

Case 0 may be classified in detail. The processor 910 may determine a field value of a coverage indicator transmitted through a PSBCH, in order to distinguish ⓑ-1 a synchronization signal transmitted from a UE that is directly synchronized by a GNSS or a GNSS-equivalent device and a synchronization signal transmitted from a UE synchronized by the UE corresponding to ⓑ-1 . When the field value of the coverage indicator is 1, it corresponds to ⓑ-1 . When the field value of the coverage indicator is 0, it corresponds to ⓑ-2.

The processor 910 may further determine whether the synchronization signal is a signal transmitted from a UE that transmits an SLSS, which is based on a GNSS or GNSS-equivalent device timing, through a root index determined through the PSSS sequence or a PSSID determined through the PSSS/SSSS sequence.

Also, the processor 910 according to the present disclosure may determine and compare at least one determined synchronization signal, and may select a synchronization signal by taking into consideration priorities that may be obtained through the combinations of cases ①, ②, ③, and ④, and cases ⓐ and ⓑ (or ⓑ-1 and/or ⓑ-2). Here, selecting a synchronization signal may include the case in which a UE itself acts as a synchronization source and transmits a synchronization signal. Also, according to an embodiment of the present disclosure, case ⓐ takes precedence over cases ②, ②, ②, and ② and selects a synchronization signal. Case ⓑ (or ⓑ-1 and/or ⓑ-2) takes precedence over one or more of cases ①, ②, ③, and ④ and selects a synchronization signal. Also, the present disclosure may include selecting a final synchronization signal by taking into consideration how a smaller number of hops is used when a synchronization signal is transmitted from the original synchronization source (eNB, GNSS, or UE). The processor may control selecting a synchronization signal based on whether the number of used hops is greater/less than or equal to a predetermined number. The processor 910 may determine whether to transmit a synchronization signal selected through the RF module 920 to the second communication device.

The memory 925 is connected to the processor 910, and stores various pieces of information for driving the processor 910. According to the present disclosure, the memory 925 may store root index information and PSSID information in association with a synchronization signal.

The RF unit 920 is connected to the processor 910, and transmits and/or receives a wireless signal. For example, the RF module 920 may receive at least one synchronization signal according to the present disclosure, and may transmit a selected synchronization signal, which is controlled by the processor 910, to the second communication device 950. The RF module 920 may transmit a PSSS and/or SSSS under the control of the processor 910, or may transmit a PSSS and/or SSSS.

The second communication device 950 may have a structure identical to the first communication device 900, and may transmit or receive a PSSS and/or an SSSS to/from the first communication device 900.

Further, according to one or more embodiments, the second communication device 950 may include a processor 960, a memory 975, and an RF module 970. The RF module 970 may receive one or more synchronization signals and the processor 970 may prioritize the received one or more synchronization signals. For example, the RF module 970 may receive a synchronization signal including a primary synchronization signal (PSS) and a secondary synchronization signal (SSS) from an evolved NodeB. The processor 960 may determine a root index from the PSS and determine, based on determining that the root index is 25, 29, or 34, that the synchronization signal was transmitted from an evolved NodeB.

The RF module 970 may receive a sidelink synchronization signal from another device, e.g., a UE or V2X device. The sidelink synchronization signal may include a primary sidelink synchronization signal (PSSS) and a secondary sidelink synchronization signal (SSSS). The PSSS is mapped in two SC-FDMA symbols in one subframe. The SSSS is mapped in different two SC-FDMA symbols in the same subframe. Based on the SSSS, the processor 960 may determine whether the transmitter of the SSSS is operating in a mode that supports synchronization with a GNSS (including GNSS-equivalent). The processor 960 determines 62 subcarriers of resource elements to which two length-31 sequences d(2n) and d(2n+1) are mapped, where n=0, 1, 2, . . . , 30. As described above, if the first length-31 sequence d(2n) includes $$s_1^{(m_1)}(n)$$

generated based on m1 and/or the second length-31 sequence d(2n+1) includes $$s_0^{(m_0)}(n)$$

generated based on m0, the processor 960 may determine that the transmitter of the SSSS is operating in a mode in which the active synchronization source could be a GNSS or GNSS-equivalent. If the first length-31 sequence d(2n) includes $$s_0^{(m_0)}(n)$$

generated based on m0 and/or the second length-31 sequence d(2n+1) includes $$s_1^{(m_1)}(n)$$

generated based on m1, the processor 960 may determine that the transmitter of the SSSS is operating in a mode in which the active synchronization source cannot be a GNSS or GNSS-equivalent.

The processor 960 may determine one synchronization timing from amongst a plurality of synchronization signals received by the RF module 970. Based on values derived from the synchronization signal selected for the determined synchronization timing, the processor 960 determine PSSID value to generate its own synchronization signal to be transmitted to another device. For example, a root index may be determined from the determined PSSID. A PSSS may be generated based on the determined root index. Further, based on the determined PSSID, m0 and m1 indices are determined (e.g., see Table 6), where m0<m1. When the selected synchronization source is a GNSS (or GNSS-equivalent) or the selected synchronization source is synchronized to the timing of a GNSS (or GNSS-equivalent), the processor generates an SSSS by generating the first length-31 sequence d(2n) based on $$s_1^{(m_1)}(n)$$

and generating the second length-31 sequence d(2n+1) based on $$s_0^{(m_0)}(n).$$

When the selected synchronization source is a GNSS (or GNSS-equivalent) or the selected synchronization source is synchronized to the timing of a GNSS (or GNSS-equivalent), the generated PSSS may be mapped to two consecutive SC-FDMA symbols in one subframe and the generated SSSS may be mapped to other two consecutive SC-FDMA symbols in the same subframe as shown in FIG. 6. The SSSS mapped to the other two consecutive SC-FDMA symbols may be mapped to subcarriers as described above in Equations 15 and 17. The first length-31 sequence d(2n) based on $$s_1^{(m_1)}(n)$$

and the second length-31 sequence d(2n+1) based on $$s_0^{(m_0)}(n)$$

are alternately mapped to 62 consecutive subcarriers as described in Equation 15. d(0) based on $$s_1^{(m_1)}(n)$$

is mapped to the lowest index of the 62 consecutive subcarriers and d(61) based on $$s_0^{(m_0)}(n)$$

is mapped to the highest index of the 62 consecutive subcarriers.

What is claimed is:

1. A first user device comprising:

at least one antenna to transmit and receive at least one wireless signal;

at least one processor; and memory storing instructions that, when executed by the at least one processor, cause the first user device to:

receive, based on a configured sidelink communication mode that supports Global Navigational Satellite Systems (GNSS) timing-based synchronization, a plurality of synchronization signals transmitted from a plurality of synchronization sources, wherein the plurality of synchronization sources comprise at least one of: one or more base stations, one or more Global Navigational Satellite Systems (GNSSs), one or more devices capable of synchronizing with the one or more GNSSs, or one or more devices capable of synchronizing with the one or more base stations;

select, based on prioritization of the plurality of synchronization signals, a synchronization signal of the plurality of synchronization signals, wherein a timing of the selected synchronization signal is associated with a synchronization timing of the one or more GNSSs, and wherein a synchronization signal of a second user device directly synchronized to the one or more GNSSs and a synchronization signal of a third user device directly synchronized to the one or more base stations are prioritized over a synchronization signal of a fourth user device indirectly synchronized to the one or more GNSSs and over a synchronization signal of a fifth user device indirectly synchronized to the one or more base stations;

map a primary sidelink synchronization signal (PSSS) to first two consecutive symbols in a subframe;

map a secondary sidelink synchronization signal (SSSS) to second two consecutive symbols in the subframe, wherein the SSSS mapped to the second two consecutive symbols in the subframe is generated based on a selected SSSS mapping scheme of a plurality of SSSS mapping schemes, wherein the selected SSSS mapping scheme is configured to use a first mapping order of sequences of the SSSS, wherein a second SSSS mapping scheme is configured to use a second mapping order of the sequences of the SSSS, and wherein the selected SSSS mapping scheme indicates that the configured sidelink communication mode that supports GNSS timing-based synchronization is associated with the SSSS; and transmit, using the at least one antenna, the PSSS and the SSSS to at least one wireless user device.

2. The first user device of claim 1, wherein the instructions, when executed by the at least one processor, cause the first user device to map, based on the selected SSSS mapping scheme, the SSSS by:

determining two integers m0 and m1, where m1 is greater than m0;

generating, based on m1, a first length-31 sequence;

generating, based on m0, a second length-31 sequence; and mapping the first length-31 sequence and the second length-31 sequence to 62 consecutive subcarriers in the second two consecutive symbols, wherein a portion of the first length-31 sequence is mapped to a subcarrier having the lowest index among the 62 consecutive subcarriers, and wherein a portion of the second length-31 sequence is mapped to a subcarrier having the highest index among the 62 consecutive subcarriers.

3. The first user device of claim 2, wherein the first length-31 sequence and the second length-31 sequence are interleaved with each other.

4. The first user device of claim 1, wherein the instructions, when executed by the at least one processor, cause the first user device to determine the plurality of synchronization signals by:

determining a different synchronization signal transmitted from a user equipment synchronized with a base station, wherein the different synchronization signal comprises a different SSSS mapped to different 62 consecutive subcarriers, and wherein the different SSSS comprises a different first length-31 sequence generated based on a first value and a different second length-31 sequence generated based on a second value, wherein the second value is greater than the first value, and wherein a portion of the different first length-31 sequence is mapped to a subcarrier having the lowest index among the different 62 consecutive subcarriers, and wherein a portion of the different second length-31 sequence is mapped to a subcarrier having the highest index among the different 62 consecutive subcarriers.

5. The first user device of claim 1, wherein in the configured sidelink communication mode, a synchronization signal of the one or more GNSSs is prioritized over the synchronization signal of the second user device directly synchronized to the one or more GNSSs and over the synchronization signal of the third user device directly synchronized to the one or more base stations.

6. The first user device of claim 1, wherein in the configured sidelink communication mode, the synchronization signal of the fourth user device indirectly synchronized to the one or more GNSSs and the synchronization signal of the fifth user device indirectly synchronized to the one or more base stations are prioritized over a synchronization signal of a sixth user device that selects an independent synchronization timing.

7. The first user device of claim 1, wherein the instructions, when executed by the at least one processor, cause the first user device to generate the PSSS based on root index 26 or root index 37.

8. The first user device of claim 1, wherein based on a second configured sidelink communication mode that does not support GNSS timing-based synchronization, the one or more GNSSs is omitted from the plurality of synchronization sources.

9. The first user device of claim 1, wherein the instructions, when executed by the at least one processor, cause the first user device to receive information associated with a sidelink communication mode;

wherein the sidelink communication mode comprises at least one of:

a first sidelink communication mode that supports a GNSS timing-based synchronization; or a second sidelink communication mode that does not support the GNSS timing-based synchronization;

wherein the second SSSS mapping scheme indicates the second sidelink communication mode that does not support the GNSS timing-based synchronization; and wherein the configured sidelink communication mode corresponds to the first sidelink communication mode.

10. The first user device of claim 1, wherein the instructions, when executed by the at least one processor, cause the first user device to receive one or more messages indicating the configured sidelink communication mode.

11. A first user device comprising:

at least one antenna to transmit and receive at least one wireless signal;

at least one processor; and memory storing instructions that, when executed by the at least one processor, cause the first user device to:

receive, based on a configured sidelink communication mode that supports Global Navigational Satellite Systems (GNSS) timing-based synchronization, a plurality of synchronization signals transmitted from a plurality of synchronization sources, wherein the plurality of synchronization sources comprise at least one of: a base station, a GNSS, or one or more devices capable of synchronizing with the GNSS or the base station;

select, based on prioritization of the plurality of synchronization signals, a synchronization signal of the plurality of synchronization signals, wherein a synchronization signal of a second user device directly synchronized to the GNSS and a synchronization signal of a third user device directly synchronized to the base station are prioritized over a synchronization signal of a fourth user device indirectly synchronized to the GNSS and over a synchronization signal of a fifth user device indirectly synchronized to the base station; and perform, based on a timing of the selected synchronization signal of the plurality of synchronization signals, synchronization by:

determining a subframe to which a primary sidelink synchronization signal (PSSS) of the synchronization signal is mapped; and determining a secondary sidelink synchronization signal (SSSS) of the synchronization signal from 62 consecutive subcarriers of two consecutive symbols in the subframe, wherein the SSSS mapped to the two consecutive symbols in the subframe is generated based on a selected SSSS mapping scheme of a plurality of SSSS mapping schemes, wherein the selected SSSS mapping scheme is configured to use a first mapping order of sequences of the SSSS, wherein a second SSSS mapping scheme is configured to use a second mapping order of the sequences of the SSSS, and wherein the selected SSSS mapping scheme indicates that the configured sidelink communication mode that supports GNSS timing-based synchronization is associated with the SSSS.

12. The first user device of claim 11, wherein the timing of the selected synchronization signal is associated with a synchronization timing of the GNSS.

13. The first user device of claim 11, wherein based on the selected SSSS mapping scheme, the SSSS comprises a first length-31 sequence generated based on m1 and a second length-31 sequence generated based on m0, where m1 is greater than m0, wherein a portion of the first length-31 sequence is mapped to a subcarrier having a lowest index among the 62 consecutive subcarriers, and wherein a portion of the second length-31 sequence is mapped to a subcarrier having a highest index among the 62 consecutive subcarriers.

14. The first user device of claim 13, wherein the first length-31 sequence and the second length-31 sequence are interleaved with each other.

15. The first user device of claim 11, wherein the instructions, when executed by the at least one processor, cause the first user device to:

determine a different synchronization signal transmitted from a user equipment synchronized with a second base station, wherein the different synchronization signal comprises a different SSSS mapped to different 62 consecutive subcarriers in a different subframe, wherein the different SSSS comprises a different first length-31 sequence generated based on a first value and a different second length-31 sequence generated based on a second value, wherein the second value is greater than the first value, and wherein a portion of the different first length-31 sequence is mapped to a subcarrier having a lowest index among the different 62 consecutive subcarriers, and wherein a portion of the different second length-31 sequence is mapped to a subcarrier having a highest index among the different 62 consecutive subcarriers.

16. The first user device of claim 11, wherein a synchronization signal of the GNSS is prioritized over the synchronization signal of the second user device directly synchronized to the GNSS and over the synchronization signal of the third user device directly synchronized to the base station.

17. The first user device of claim 11, wherein the synchronization signal of the fourth user device indirectly synchronized to the GNSS and the synchronization signal of the fifth user device indirectly synchronized to the base station are prioritized over a synchronization signal of a sixth user device that selects an independent synchronization timing.

18. The first user device of claim 11, wherein the instructions, when executed by the at least one processor, cause the first user device to determine, based on the PSSS, root index 26 or root index 37.

19. The first user device of claim 11, wherein based on a second configured sidelink communication mode that does not support GNSS timing-based synchronization, the GNSS is omitted from the plurality of synchronization sources.

20. The first user device of claim 11, wherein the instructions, when executed by the at least one processor, cause the first user device to receive one or more messages indicating the configured sidelink communication mode.

* * * * *